Aug. 5, 1924.
H. F. C. SCHULTZ
1,503,808
ATTACHMENT FOR ANTISKID DEVICES
Filed Dec. 11, 1923
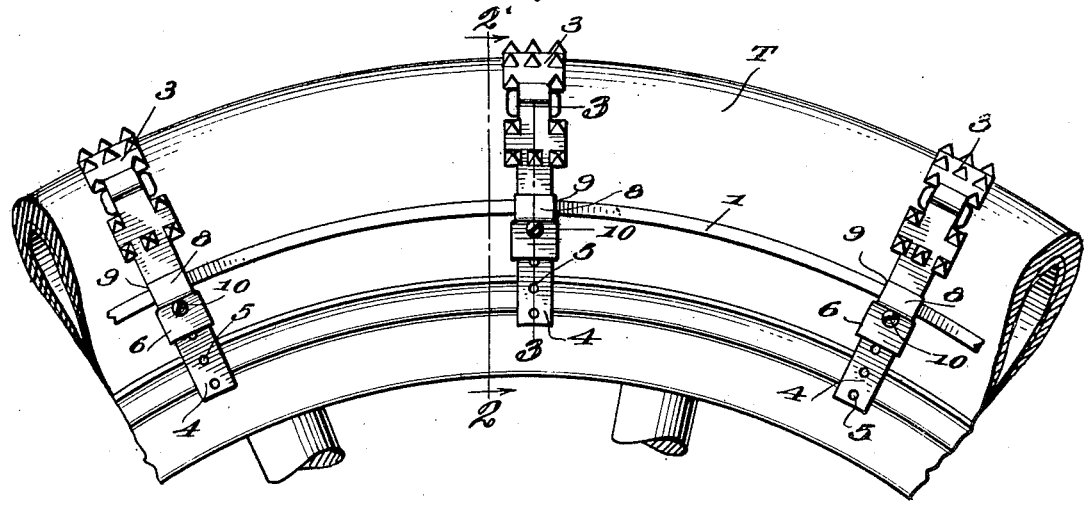
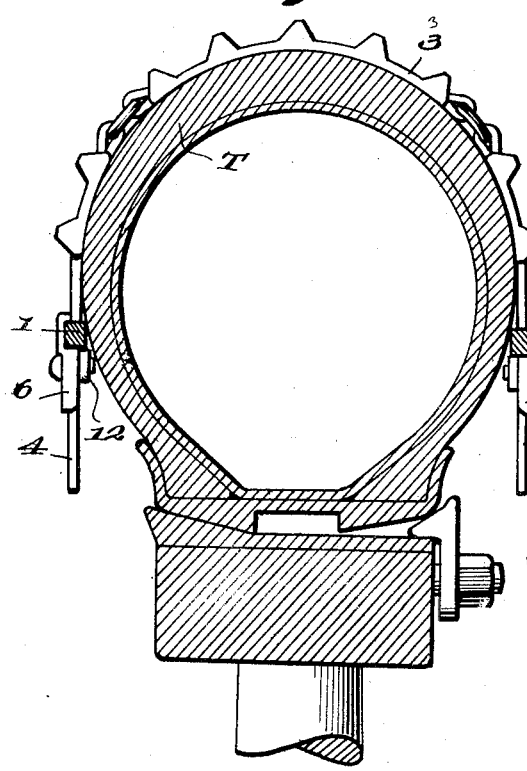
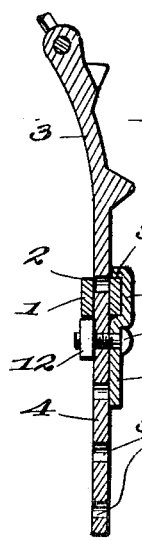
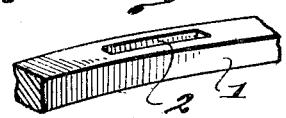
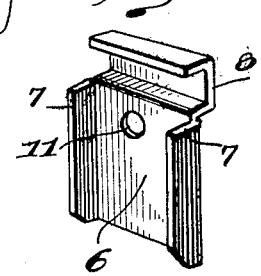
Inventor
Herman F. C. Schultz
By W. C. Carman
Attorney Patented Aug. 5, 1924.

1,503,808

UNITED STATES PATENT OFFICE.

HERMAN F. C. SCHULTZ, OF YOUNGSTOWN, OHIO.

ATTACHMENT FOR ANTISKID DEVICES.

Application filed December 11, 1923. Serial No. 679,923.

*To all whom it may concern:*

Be it known that I, HERMAN F. C. SCHULTZ, a citizen of the United States, residing at Youngstown, in the county of Mahoning and State of Ohio, have invented certain new and useful Improvements in Attachments for Antiskid Devices, of which the following is a specification.

This invention relates to traction and non-skid devices for tires for automobile or vehicle wheels, and is designed more particularly to provide an adjustable efficient and substantial method of securing the cross-section traction or non-skid elements to the tires, or more properly speaking, to the holding rings disposed at opposite sides of the tire.

In the accompanying drawings, Figure 1 is a partial side elevation or a tire, showing the application of my device;

Figure 2 is an enlarged cross-section on line 2—2 Figure 1;

Figure 3 is a fragmentary view in section on line 3—3, Figure 2, showing in detail the construction of my device;

Figure 4 is a perspective view of the clamping member; and Figure 5 is a perspective view of a section of the holding ring, showing the opening 2.

Similar reference characters designate corresponding parts of the device throughout the various figures of the drawings.

T represents the tire, and 1—1 the holding rings disposed at the opposite sides thereof, and provided with a plurality of openings 2.

3 represents the traction or non-skid member, which may be of any desired type or design. Secured to the opposite ends of this member are the oppositely disposed extension bars or straps 4, each provided with a plurality of openings 5, and as these straps are attached to the opposite rings in precisely the same manner, further description in the singular will suffice.

6 represents the clamping member, having the oppositely disposed side flanges 7 adapted to slidingly engage the edges of the bars or straps 4, and carrying on its inner end the transverse channel-shaped engaging element or clip 8.

To attach the non-skid or traction member to the holding ring, the bar or strap 4 is passed through the opening 2 in the holding ring 1, after which the clamping member 6 is applied, with the cross-engaging element 8 embracing the outer portion of the ring 1 adjacent the opening 2, as at 9, and is then secured to the strap 4 by means of bolt 10 passing through the opening 11 in the clamping member and through the proper opening 5 in strap 4, and held in position by nut 12.

It will be observed that by this construction, a plurality of traction or non-skid members of any desired type may be securely attached to tires or rings of varying sizes, by using the proper opening 5 in the strap 4, and at the same time the inner portion of the ring 1 adjacent the opening 2 constitutes a holder or lock for nut 12.

I claim:

1. In a device of the character described, in combination with a tire, a pair of holding rings, each provided with a plurality of openings and adapted to be disposed upon opposite sides of said tire, a plurality of cross-section members, each of said members being provided at each end with an extension strap or bar adapted to engage an opening in said ring, a clamping member slidably engaging said extension bar, and provided at its inner end with a transverse clip element adapted to engage said holding ring, and means for holding said clamping member at any pre-determined point upon said bar.

2. In a device of the character described, in combination with a tire, a pair of holding rings, each provided with a plurality of openings and adapted to be disposed upon opposite sides of said tire, a plurality of cross-section members, each of said members being provided at each end with an extension strap or bar adapted to engage an opening in said ring, and provided with one or more openings, a clamping member slidably engaging said extension bar, and provided at its inner end with a transverse clip element adapted to engage said holding ring, and means for holding said clamping member at any pre-determined point upon sad bar.

In testimony whereof I hereunto affix my signature in the presence of two witnesses.

HERMAN F. C. SCHULTZ.

Witnesses:
M. O. ABEY,
ALICE McGINN.